United States Patent [19]

Marko, Jr.

[11] 4,187,407
[45] Feb. 5, 1980

[54] WELDED LAP JOINT AND METHOD OF MAKING THE SAME

[75] Inventor: John J. Marko, Jr., Roseville, Mich.

[73] Assignee: General Motors Corporation, Detroit, Mich.

[21] Appl. No.: 939,416

[22] Filed: Sep. 5, 1978

[51] Int. Cl.$^2$ .................... F16B 11/00; B23K 11/10
[52] U.S. Cl. ................... 219/91.2; 219/91.23; 403/271
[58] Field of Search .......... 219/91.2, 91.23, 94, 219/86.23; 403/270, 271

[56] References Cited

U.S. PATENT DOCUMENTS

| | | | |
|---|---|---|---|
| 1,206,890 | 12/1916 | Hoffer | 219/91.2 |
| 1,502,052 | 7/1924 | Naylor | 403/270 |
| 2,270,278 | 1/1942 | Dunn | 219/91.2 |
| 3,132,236 | 5/1964 | Deninger | 219/91.2 |

Primary Examiner—E. A. Goldberg
Attorney, Agent, or Firm—Warren D. Hill

[57] ABSTRACT

A welded lap joint is made in sheet metal panels by folding over the margin of one panel to form a U-shaped section and to crimp within the U-section a sheet metal spacer strip thereby producing a three layer configuration. The margin of a second panel is formed into an offset by an amount equal to the thickness of the three layers of the U-shaped section of the first panel. The offset margin of the second panel is spot welded to the bent over margin of the first panel using a conventional welding electrode bearing against the margin of the second panel and an electrode of large load distributing area contacting the top surface of the first panel so that the weld nugget formed between the margins of the two panels is isolated by the spacer from the surface of the first panel to avoid weld marking of the surface. The resultant product comprises first and second panels in the same plane and separated by a very small crevice. The crevice, if desired, may be filled with a filler material such as a plastisol.

3 Claims, 6 Drawing Figures

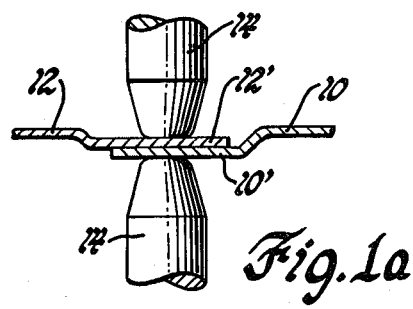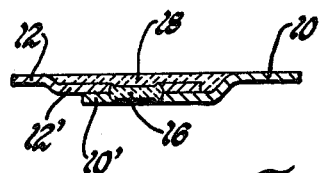
PRIOR ART
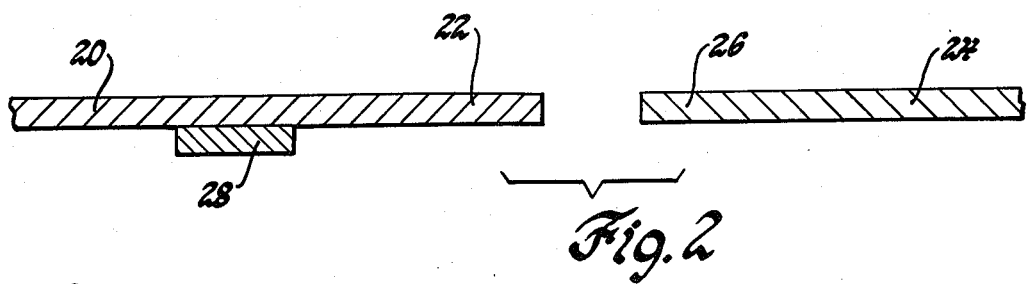
Fig. 2
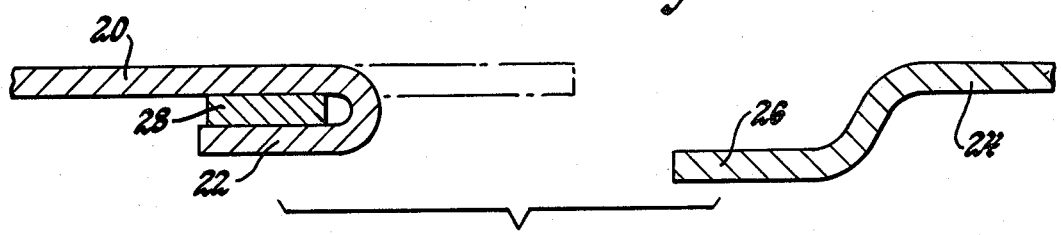
Fig. 3
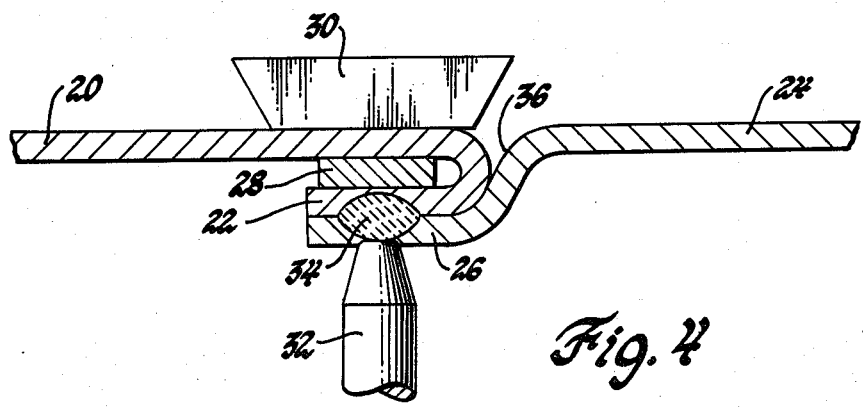
Fig. 4
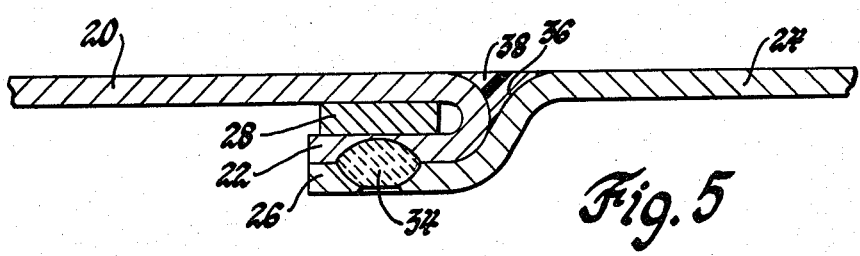
Fig. 5

WELDED LAP JOINT AND METHOD OF MAKING THE SAME

This invention relates to welded lap joints between two sheet metal panels and to a method for making such lap joints.

In sheet metal fabrication, for example, as used in the production of automotive vehicle bodies lap joints are used in many places where the strength of the welded area is an important consideration. Using traditional techniques and joint structure, the spot welding electrodes leave objectionable indentations in the panel outer surface requiring extensive solder fill and metal finishing to produce an acceptable surface appearance.

It is, therefore, an object of the invention to provide a method of forming a welded lap joint which is substantially free of weld marks and requires a minimum of surface preparation to produce an acceptable surface appearance.

It is a further object of the invention to provide an improved welded lap joint substantially free of weld marks.

The invention is carried out by the method of bending over the sheet of one panel in a U-shaped section to crimp a metal spacer between the edge and the panel, to form the margin of a second panel in an offset and weld the two panel margins together using an electrode of large surface area on the outside of the first panel and a conventional spot welding electrode on the inside of the second panel so that a spot weld is made between the two panel margins and is separated from the outside of the first panel by the spacer to minimize or eliminate weld marking on the outer surface.

The invention is further carried out by a lap joint wherein an edge of a first panel has three layers of sheet metal including a panel margin bent in a U-shaped toward the under surface of the panel and a spacer strip crimped in the center of the U-shaped section and a fourth layer comprising an edge of a second panel spot welded to the bent back margin of the first panel, and an offset portion adjacent the edge of the second panel to align the second panel outer surface with the first panel outer surface, the two surfaces being separated by a small crevice.

The above and other advantages will be made more apparent from the following specification taken in conjunction with the accompanying drawings wherein like reference numerals refer to like parts and wherein:

FIGS. 1a and 1b are cross-sectional views of a conventional prior art welded lap joint showing the welding step and the finished joint respectively.

FIGS. 2, 3 and 4 are cross-sectional views of sheet metal joint components illustrating steps in fabrication of a lap joint according to the invention, and FIG. 5 is a cross-sectional view of the finished lap joint according to the invention.

Referring to FIG. 1a, a prior art sheet metal welded lap joint is formed in panels 10 and 12 wherein margins 10' and 12' of the panel 10 and 12 respectively are offset such that when they are laid together the main body of the panels 10 and 12 are aligned in the same plane or along the same slightly curved surface. Conventional welding electrodes 14 produce a series of spot welds in the area of margin overlap. As shown in FIG. 1b, the resultant welds 16 unite the two margins of the sheets 10 and 12 by a common nugget which is indented on both sides by the electrode 14. Since both sheets have an offset margin, a channel or trough is defined between the main panel surfaces. To provide a smooth surface over the area of the joint, the trough or channel is filled with solder 18 and the surface thereof metal finished. While the spot welded joints are readily made in this manner, the solder filling and metal finishing operation is time consuming and expensive. The method and apparatus of this invention described hereafter eliminate or minimize the problems of producing a lap joint of good appearance.

Referring to FIG. 2, a first panel 20 has a margin 22 along the edge thereof which is to be joined to a second panel 24. The second panel also includes a margin 26. The panels are preferably of sheet steel. A spacer strip 28 also of sheet steel is placed on the underneath side of the first panel 20 along the edge thereof but inboard of the margin 22. Then as shown in FIG. 3 the margin 22 is bent back toward the rear surface of the panel 20 to form a U-shaped cross-section and to crimp the spacer 28 within the U-shaped section thereby forming a three layered edge. The second panel 24 is deformed by forming an offset along the edge such that the margin 26 is parallel to the main body of the panel 24 and removed from the upper surface thereof by a distance equal to the thickness of the three layer edge assembly of the first panel.

As shown in FIG. 4, the two panels are assembled with the offset margin 26 of the second panel 24 overlapping the bent over margin 22 of the first panel 20 and a spot weld is formed between the margins 26 and 22. A welding electrode 30 of very large area compared to the size of the weld nugget to be produced is placed against the outer surface of the panel 20 aligned with the three layer edge thereof so as to spread the welding pressure over a wide area to minimize any mechanical marking of the panel due to the welding process. A conventional resistance welding electrode 32 of work contact area comparable to the size of the nugget 34 being produced engages the rear side of the margin 26. The weld is made between the margins 22 and 26 such that an indentation is formed on the rear or lower side of the margin 26. The weld nugget 34 is confined to the margins 22 and 26. The spacer 28 has the affect of isolating the main body portion of the panel 20 from the weld nugget so that the surface is not marred by the nugget formation.

The resultant welded assembly comprises the main body sections of the panels 20 and 24 lying in essentially the same plane separated only by a small crevice 36 where the offset of the second panel 24 meets the rolled over edge of the first panel 20. As shown in FIG. 5, the joint is finished by filling the crevice 36 with a filler 38 such as a plastisol sealer. Since the crevice 36 is so small, the filling and finishing of the crevice is a minor operation as compared to the extensive finishing work which must be performed on the joint illustrated in FIG. 1.

The resulting joint is as strong as the prior art joint. The joint comprises a four layer configuration, one layer of which is contributed by the margin 26 of the second panel 24, one layer comprises the spacer 28 and the other two layers comprise portions of the panel 20 and its margin 22 forming the U-shaped section sandwiching the spacer 28. The weld is formed between the margin portions which are spaced from the top surface of the resultant panel so that the marking due to the weld is minimized or eliminated.

The embodiments of the invention in which an exclusive property or privilege is claimed are defined as follows:

1. A method of forming a welded lap joint in sheet metal panels to form a substantially uninterrupted outer surface across the joint comprising the steps of:

- positioning a metal spacer strip along the edge of a first panel on the back surface and spaced from said edge thereof,
- bending the margin of the first panel from the plane of the outer panel surface back against the spacer strip to form a U-shaped section with the spacer strip crimped inside the U-shaped section,
- forming the margin of the second panel in an offset substantially parallel to the outer panel surface and spaced from the plane of the second panel surface by an amount equal to the thickness of the U-shaped section of the first panel,
- assembling the second panel margin to the bent back first panel margin by overlapping the margins so that the outer surfaces of the first and second panels are substantially coplanar and spaced by a small crevice, and joining the panels by welding the panel margins together so that the outer surface of the first panel is separated from the weld by the spacer strip and is substantially free of weld marks.

2. A method of forming a welded lap joint in sheet metal panels to form an uninterrupted outer surface across the joint comprising the steps of:

- positioning a metal spacer strip along the edge of a first panel and spaced from said edge,
- bending the margin of the first panel from the plane of the outer panel surface back against the spacer strip to form a U-shaped section with the spacer strip crimped inside the U-shaped section,
- forming the margin of the second panel in an offset substantially parallel to the outer panel surface and spaced from the plane of the second panel surface by an amount equal to the thickness of the U-shaped section of the first panel,
- assembling the second panel margin to the bent back first panel margin by overlapping the margins and spot welding the two panel margins together, the spot welding being carried out by a small electrode of area comparable to the area of the weld nugget to be formed engaging the second panel margin, which electrode is opposed by a large area electrode which leaves no electrode indentation on the first panel outer surface, whereby the spacer strip separates the first panel outer surface from the weld nugget to minimize marking of said surface, and whereby a small crevice is formed between the outer surfaces of the two panels, and
- filling the crevice with a filler material and shaping the filler material to provide an uninterrupted outer surface across the joint.

3. A welded lap joint of two sheet metal panels presenting a substantially uninterrupted surface across the joint comprising

- an edge of a first panel having three layers of sheet metal including a panel margin bent back toward the under surface of the panel and a sheet metal spacer strip sandwiched between the margin and the under surface of the panel,
- a second panel having an edge thereof lying flat against the bent back margin of the first panel and spot welded thereto to form a four layer assembly with the outer surface of the first panel separated from the welds by the spacer strip, the second panel having an offset adjacent the first panel to align the second panel outer surface with the first panel outer surface and to define a small crevice in the joint at the outer surface of the two panels wherein the outer surface across the joint is substantially uninterrupted.

* * * * *